Feb. 17, 1931.　　　　C. L. WILLIS　　　　1,792,955
SAW
Filed June 17, 1929　　2 Sheets-Sheet 1

Inventor
Clayton L. Willis
By
Attorney

INVENTOR
Clayton L. Willis
BY
ATTORNEY

Patented Feb. 17, 1931

1,792,955

UNITED STATES PATENT OFFICE

CLAYTON L. WILLIS, OF DETROIT, MICHIGAN

SAW

Application filed June 17, 1929. Serial No. 371,358.

This invention relates to improvements in saws, and aims, among other things, to provide a saw wherein the blade is movable relative to the work table, and a portion of it projects upwardly through a longitudinal slot in the table parallel with the direction of movement of the blade, so that work may be placed on the table against a rest and the blade gradually advanced as it cuts the work; moreover the saw blade is so arranged that when it projects through any portion of the work table slot it may be employed as a rip saw and will under usual circumstances remain still as far as movement longitudinally of the slot is concerned when work is pressed against it.

Another object of the invention is to provide such a saw having a removable pivotally mounted rest on the work table which may be turned and held at varying angles so that work resting against it can be cut at the angle for which the rest is set.

A further object of the invention is to provide such a saw with a removable extension rest on one side of the table at right angles to the direction of movement of the blade, and to provide a projecting rest in alignment with the work table rest when the latter is set at right angles to the blade, so that greater support may be given to long work being cut, thus insuring the latter remaining in correct position in front of the blade.

With these and other objects and advantages in view which will become apparent as the specification proceeds, the invention is hereinafter more fully described with the aid of the accompanying drawings, in which:

Figure 1 illustrates a plan view of the invention with the extension rest in place.

Figures 2 and 3 are sections on the lines 2—2 and 3—3 respectively of Figure 1.

Figure 1:
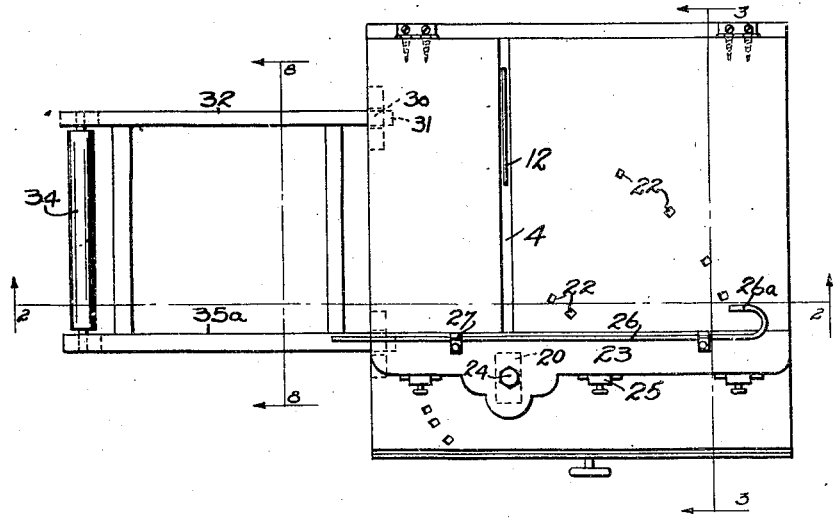
Figure 2:
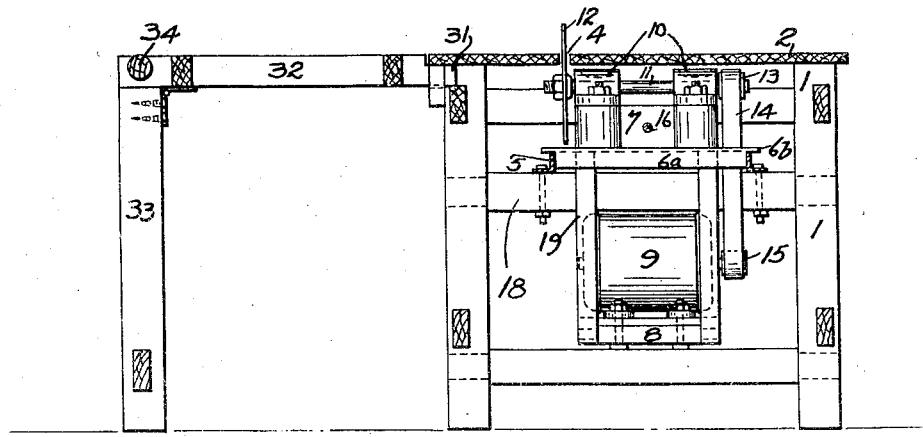
Figures 8, 9:
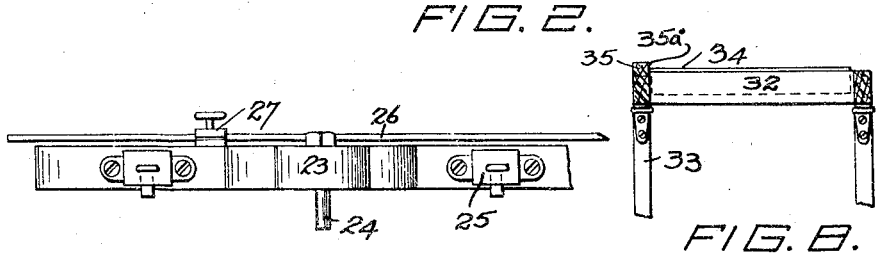
Figure 8 is a section on the line 8—8 of Figure 1.
Figure 9 is an enlarged rear view of the rest.
Figure 4:
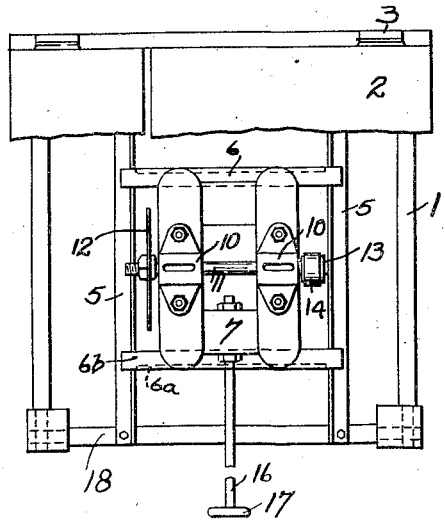
Figure 4 is a plan view of the invention with a portion of the work table broken away.
Figure 5:
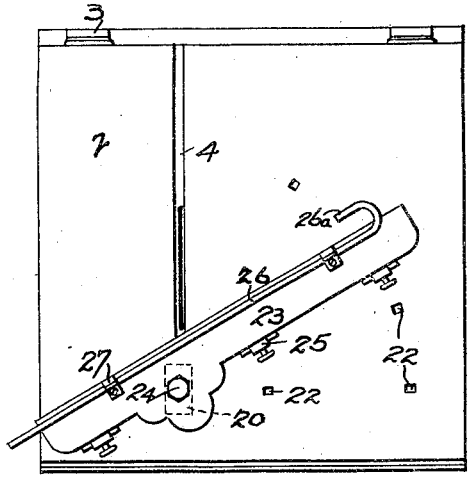
Figure 5 is a plan view showing the rest set at an angle to the table.
Figure 3:
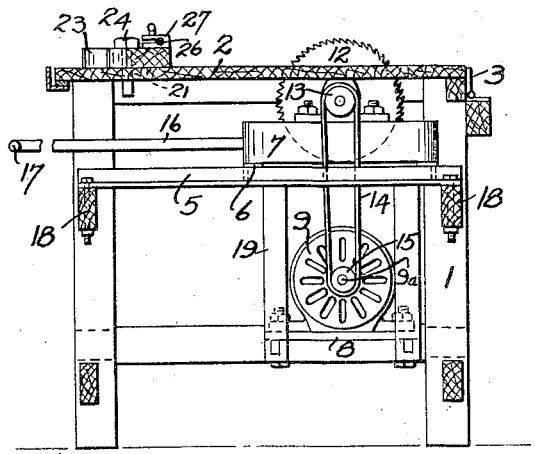

Referring to the drawings, 1 designates a frame having a table 2 supported thereon. This table is preferably hinged to the frame as shown at 3 so that it may be raised to give access to working parts located beneath it. A longitudinal slot 4 extends through the work table for the major portion of its length. Lengthwise of the table (that is parallel with the slot 4) and supported by the frame 1 are guides 5, which, in the present instance, consist of angle iron. Arranged transversely on the guides 5 and having their extremities riding thereon, are slides 6 which are held in spaced relation to one another by a carriage 7. It will be noted that the slides 6 are, in the construction shown, also made of angle iron, and have their vertical legs 6a shorter than their horizontal legs 6b, so that the former bear against the inner sides of the guides 5 and thus hold the carriage 7 in alignment at all times.

A platform 8 is dependingly supported from the carriage 7 and has an electric motor 9 secured thereon. Supported as by bearings 10 on the carriage 7 is a mandrel 11 having a circular saw blade 12 mounted towards one extremity and a pulley 13 towards the other. The pulley 13 is driven by a belt 14 which also passes around a second pulley 15 on the motor shaft 9a. Projecting forwardly from the carriage 7, and preferably secured substantially centrally of the width of the latter is a rod 16 which terminates in a handle 17. By the latter the carriage may be moved in either direction on its guides 5. The resistance of the slides 6 and carriage 7 against movement on the guides 5, when the hereinbefore described construction is employed, is sufficient however to permit the saw blade 12 being used for ripping purposes and the work being pushed past it as it is cut. Horizontal cross members 18 in the frame 1 engage the depending members 19 by which the platform 8 is supported when the slides 6 reach either end of the their travel, so that the carriage is protected against accidental disengagement from the frame.

Beyond one end of the slot 4 in the table 1 a plate 20 is let into the latter and suitably held in place. Through this plate an opening 21 is formed which extends right through the table. Apertures 22 are also cut in the table 2.

A rest 23, provided with a pin 24 and latches 25, is adapted to be placed crosswise of the table with its pin 24 taking into the aperture 21 and its latches engaging some of the apertures 25. It will be noted that the latter are so positioned that the rest may be held and work set against it at various angles relative to the saw blade.

On the rest 23 a gauge 26 is mounted in clamping bearings 27 so that its U-shaped end 26a may be held any desired distance from the line along which the saw moves, and at varying heights from the table by turning the rod slightly about its own axis.

In the side of the frame 1 recesses 30 are formed to receive the ends 31 of the removable extension table 32. The latter has legs 33 preferably pivotally arranged thereunder so as to make the said table collapsible. Across the extension table, to facilitate the movement of lumber across it, is a roller 34 having its axis substantially parallel with the slot 4; and 35 denotes an upwardly projecting member on the extension table having its bearing surface 35a in alignment with the bearing surface of the rest 23. This projecting member affords additional support for long work against which the saw blade 12 is moved.

Figure 6:
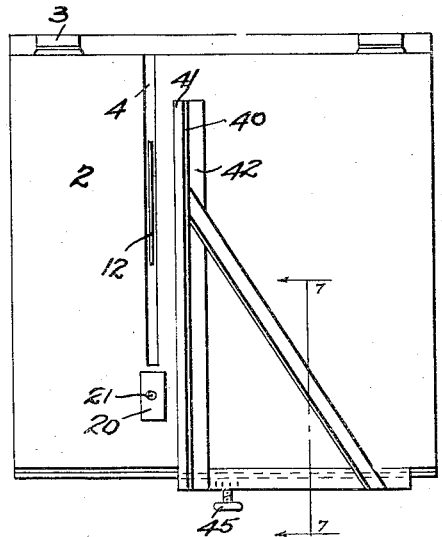
Figure 6 is a plan view showing the invention being used as a rip saw.
Figure 7:
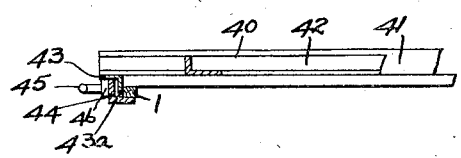
Figure 7 is a section on the line 7—7 of Figure 6.

Figures 6 and 7 show a conventional type of work rest used on rip saws which may be satisfactorily employed on the present machine. The work rest 40 consists of a plate 41 backed by an angle iron 42. The rear end of the latter is secured to a second angle iron 43 the vertical leg 43a of which is adapted to lie between a rail 44 spaced from the back of the table 1 and the latter. 45 indicates a clamping screw which is in threaded engagement with a lug 46 on the angle iron 43 and is adapted to hold the work rest 40 against movement by exerting pressure against the angle iron 42.

While in the foregoing the preferred embodiment of the invention has been described and shown, it is understood that the construction is susceptible to such modifications and alterations as fall within the scope of the appended claim.

What I claim as my invention and desire to secure by Letters Patent is:

In a power driven saw, a table having a slotted top for receiving the saw, and legs; a plurality of angle-iron stringers arranged longitudinally of the table in spaced, parallel relationship adjacent the top thereof, a plurality of spaced, parallel angle-iron stringers arranged transversely of the table and adapted to slide as a unit upon the upwardly extending flanges of the longitudinal stringers, said transverse stringers adapted to support a saw assembly so that the saw is movable in the slotted top and the power plant depending beneath the saw assembly to move with the saw assembly in the space between the longitudinal stringers.

CLAYTON L. WILLIS.